(12) United States Patent
Edberg et al.

(10) Patent No.: US 9,205,430 B2
(45) Date of Patent: Dec. 8, 2015

(54) STEAM MILL SYSTEM USEFUL FOR MERCURY CONTROL

(71) Applicant: ALSTOM Technology Ltd, Baden (CH)

(72) Inventors: Carl David Edberg, Stafford Springs, CT (US); Raymond W. Cournoyer, Enfield, CT (US); Richard C. Laflesh, Suffield, CT (US); Timothy Joseph Braun, Marlborough, CT (US)

(73) Assignee: ALSTOM Technology Ltd, Baden (CH)

( * ) Notice: Subject to any disclaimer, the term of this patent is extended or adjusted under 35 U.S.C. 154(b) by 374 days.

(21) Appl. No.: 13/910,494

(22) Filed: Jun. 5, 2013

(65) Prior Publication Data

US 2014/0361105 A1 Dec. 11, 2014

(51) Int. Cl.
*B02C 19/06* (2006.01)
*B02C 23/08* (2006.01)
*B01D 53/64* (2006.01)
*B01D 53/83* (2006.01)
*F23J 15/00* (2006.01)

(52) U.S. Cl.
CPC ............... *B02C 23/08* (2013.01); *B01D 53/64* (2013.01); *B01D 53/83* (2013.01); *B02C 19/06* (2013.01); *B01D 2253/304* (2013.01); *F23J 15/003* (2013.01); *F23J 2215/60* (2013.01); *F23J 2219/30* (2013.01)

(58) Field of Classification Search
CPC ................................ B02C 19/06; B02C 23/08
USPC .................................... 241/5, 39, 19, 79.1, 81
See application file for complete search history.

(56) References Cited

U.S. PATENT DOCUMENTS

| 6,719,828 B1 | 4/2004 | Lovell et al. |
| 7,361,209 B1 | 4/2008 | Durham et al. |
| 2013/0078169 A1 | 3/2013 | Laflesh et al. |

*Primary Examiner* — Mark Rosenbaum
(74) *Attorney, Agent, or Firm* — Robert D. Crawford

(57) ABSTRACT

A steam mill system for transport of powdered activated carbon (PAC) from a storage silo to a steam powered jet mill to produce milled sorbent for use in a coal-fired power plant flue gas for mercury control. More specifically, the present disclosure relates to a cyclone separator arranged in a PAC transport line prior to a steam powered jet mill for separation of PAC according to particle size for the purpose of achieving reductions in associated compressed air usage, operating costs and capital costs.

15 Claims, 1 Drawing Sheet

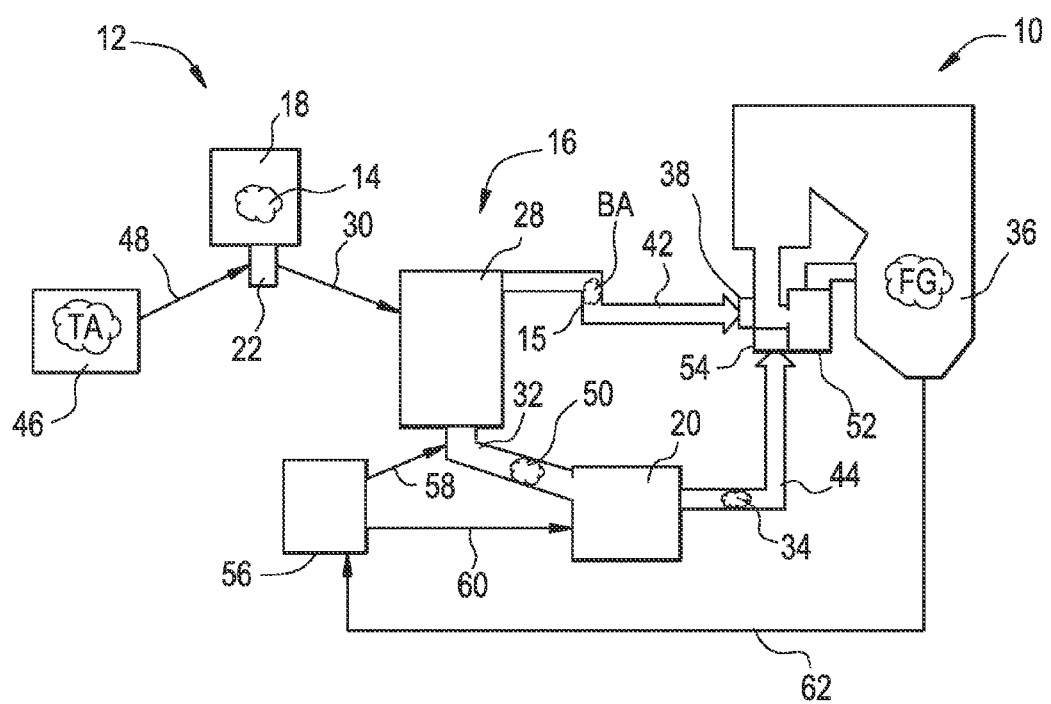

STEAM MILL SYSTEM USEFUL FOR MERCURY CONTROL

FIELD OF THE INVENTION

The present disclosure relates to a steam mill system useful for transport of powdered activated carbon (PAC) from a storage silo to a steam powered jet mill for use of PAC milled therein in mercury control applications. More specifically, the present disclosure relates to a cyclone separator arranged in a PAC transport line prior to a steam powered jet mill for the purpose of achieving system reductions in associated compressed air usage, operating costs and capital costs.

BACKGROUND OF THE INVENTION

The use of activated carbon for the adsorption of mercury vapor has been successfully demonstrated in various applications. The utilization factor for activated carbon in adsorption of mercury vapor is limited by the relatively large particle size and low surface area of the activated carbon, which limits mercury adsorption. Using activated carbon with a mean particle size of about 5 microns with a top size of about 10 microns improves mercury capture efficiency, but storage, handling, transport and dispersion of particles of such size is extremely difficult. As a result, the use of activated carbon for mercury capture in coal-fired power plants is costly. In coal-fired power plant mercury control applications, adsorption utilization of the activated carbon is quite low with a minimum mole ratio of carbon to mercury of 10,000 to 1. Hence, methods and/or systems that reduce costs associated with the use of activated carbon for mercury capture are needed.

SUMMARY OF THE INVENTION

An object of the present disclosure is to provide a system and a method for mercury capture from a coal-fired power plant flue gas comprising mercury using a carbonaceous sorbent, such as activated carbon (AC) or powdered activated carbon (PAC), that reduces associated compressed air usage, operating costs and capital costs.

The subject system is a steam mill system that transports a carbonaceous sorbent, such as AC or PAC from a storage silo to a steam powered jet mill using a compressed air powered eductor, or more preferably, a lower pressure eductor and blower combination. In the subject system, a cyclone separator is arranged in a transport line immediately prior to the steam powered jet mill to separate the carbonaceous sorbent from the transport air. The cyclone separator separates carbonaceous sorbent particles from the transport air that are equal to or greater in size than the nominal mill outlet particle size. These relatively larger separated carbonaceous sorbent particles are injected directly into the steam powered jet mill by means of a steam powered eductor arranged on the steam powered jet mill. In the steam powered jet mill, these relatively larger separated carbonaceous sorbent particles are milled to a desired particle size and emerge as milled carbonaceous sorbent particulates. The milled carbonaceous sorbent particulates are then injected directly into flue gas produced in a coal-fired boiler. Carbonaceous sorbent particles in the transport air stream that are smaller than the desired size are carried through the cyclone separator with the transport air and bypass the steam powered jet mill as a bypass air stream with entrained smaller carbonaceous sorbent particles therein. This bypass air stream with entrained smaller carbonaceous sorbent particles is also injected by a steam injector directly into flue gas produced in the coal-fired boiler. As such, the carbonaceous sorbent flow capability of the overall system is increased. Additionally, the cyclone separator and the steam injector are operated to process the carbonaceous sorbent at the same flow rate as that of the carbonaceous sorbent supplied from the storage silo. Hence, no carbonaceous sorbent storage is required at the location of the steam powered jet mill. An additional feature of the subject system that improves safety is that the cyclone separator operates to relieve backpressure to a connected transport line in the case of an obstruction or pressure increase in an air line or steam line.

The subject disclosure is accordingly directed to a system for processing carbonaceous sorbent comprising a sorbent silo, a cyclone separator for separating transport air and small sorbent particles from the larger sorbent particulates, a steam powered jet mill for milling larger sorbent particulates to produce milled sorbent, an air line for transport of smaller sorbent particles for injection of the smaller sorbent particles into a boiler flue gas containing mercury for mercury adsorption by the smaller sorbent particles, and a steam line for transport of milled sorbent for injection of milled sorbent into a boiler flue gas containing mercury for mercury adsorption by the milled sorbent. The smaller sorbent particles are transported in an air line at a pressure of about 5 to about 15 psig, or preferably at a pressure of about 1.5 to about 6 psig, supplied by a compressed air powered primary transport eductor. The smaller sorbent particles so transported are about 3 to about 18 microns in size. The milled sorbent particulates are transported in a steam line at a pressure of about 5 to about 15 psig, or preferably at a pressure of about 1.5 to about 6 psig, supplied by a steam powered eductor. The milled sorbent particulates so transported are about 3 to about 18 microns in size. Prior to milling, the larger sorbent particulates are about 9 to about 30 microns in size. In this described system, the cyclone separator releases pressure into a transport line upon an obstruction in the transport of smaller sorbent particles or milled sorbent. Also in the subject system, an injector for injection of milled sorbent is operated at an operation rate the same as an operation rate of the cyclone separator thus avoiding need for storage of carbonaceous sorbent at the site of milling.

The subject disclosure is likewise directed to a method for processing carbonaceous sorbent comprising providing a sorbent silo for supply of a carbonaceous sorbent to a cyclone separator for separation the carbonaceous sorbent into larger sorbent particulates and smaller sorbent particles, using a steam powered jet mill for milling larger sorbent particulates to produce milled sorbent, transporting smaller sorbent particles to injection into a boiler flue gas comprising mercury for mercury adsorption by the smaller sorbent particles, and transporting milled sorbent to injection into a boiler flue gas comprising mercury for mercury adsorption by the milled sorbent. According to the subject method, the smaller sorbent particles are transported in an air line at a pressure of about 5 to about 15 psig, or preferably at a pressure of about 1.5 to about 6 psig, supplied by a compressed air powered primary transport eductor. The smaller sorbent particulates so transported are about 3 to about 18 microns in size. The milled sorbent particulates are transported in a steam line at a pressure of about 5 to about 15 psig, or preferably at a pressure of about 1.5 to about 6 psig, supplied by a steam powered eductor. The milled sorbent particulates so transported are about 3 to about 18 microns in size. Prior to milling, the larger sorbent particulates are about 9 to about 30 microns in size. In this described method, the cyclone separator releases pressure into an injection duct upon an obstruction in the transport of smaller sorbent particles or milled sorbent. Also in the subject method, an injector for injection of milled sorbent is operated at an operation rate the same as an operation rate of the cyclone separator thus avoiding need for storage of carbonaceous sorbent at the site of milling.

Other features and advantages of the subject system and method will become apparent from the following drawings and specification.

BRIEF DESCRIPTION OF THE DRAWINGS

The present system and method is further described and its numerous features and advantages made apparent to those skilled in the art by reference to the accompanying drawing in which:

FIG. 1 is a schematic diagram of a carbonaceous sorbent processing system according to the present disclosure.

DETAILED DESCRIPTION

Illustrated in FIG. 1, is a carbonaceous sorbent processing system 12 useful for processing a carbonaceous sorbent 14, such as activated carbon (AC) or powdered activated carbon (PAC) for use in a coal-fired power plant 10 for mercury capture applications.

The subject carbonaceous sorbent processing system 12 includes a steam powered mill system 16 that transports a carbonaceous sorbent 14, such as AC or PAC from a storage silo 18 to a steam powered jet mill 20 using a compressed air powered eductor 22. The eductor 22 provides a pressure of about 15 psig, or more preferably, a lower pressure eductor 22 and blower 46 combination provide a combined pressure of about 3 psig to the steam powered mill system 16. The lower pressure eductor 22 and blower 46 combination is preferred in the subject steam powered mill system 16 in order to further reduce system operation costs and capital costs.

In the subject steam powered mill system 16, blower 46 is fluidly connected to eductor 22 of storage silo 18 by an air line 48. Transport air (TA) from blower 46 flows through air line 48 to eductor 22 of storage silo 18 to transport carbonaceous sorbent 14 from storage silo 18 to a fluidly connected cyclone separator 28. As such, cyclone separator 28 is arranged in a transport line 30 fluidly connecting cyclone separator 28 to eductor 22 of storage silo 18. Cyclone separator 28 is arranged immediately prior to and fluidly connected to steam powered jet mill 20 by means of a steam powered eductor 32 arranged therebetween within the subject steam powered mill system 16. Cyclone separator 28 separates the carbonaceous sorbent 14 from the transport air TA. As such, the cyclone separator 28 separates carbonaceous sorbent 14 particulates from the transport air TA that are equal to or greater in size than the nominal mill outlet particle size. The nominal mill outlet particle size is about 5 microns (D50). These relatively larger separated carbonaceous sorbent particulates 50, about 9 to about 30 microns in size (nominally 18 microns), are injected directly into the steam powered jet mill 20 by means of the steam powered eductor 32 arranged on and fluidly connected to the steam powered jet mill 20. In the steam powered jet mill 20, these relatively larger separated carbonaceous sorbent particulates 50 are milled utilizing steam as a grind material to a desired particle size to emerge as milled carbonaceous sorbent 34 particulates about 3 to about 18 microns in size (nominally 5 microns). The desired particle size of the milled carbonaceous sorbent 34 particulates is 3 to 18 microns. The milled carbonaceous sorbent 34 particulates are then transported through steam line 44, which fluidly connects steam powered jet mill 20 with boiler 36 upstream of air preheater 52. As such, milled carbonaceous sorbent 34 particulates are injected by steam injector 54 directly into flue gas (FG) comprising mercury produced in coal-fired boiler 36 of coal-fired power plant 10 for mercury capture.

Carbonaceous sorbent 14 particles in the transport air TA stream that are smaller than the desired size of 18 microns are carried through the cyclone separator 28 with the transport air TA bypassing the steam powered jet mill 20 as smaller sorbent particles 15, about 3 to about 18 microns in size (nominally 5 microns), entrained in a bypass air (BA) stream. Bypass air BA stream with entrained smaller sorbent particles 15 is transported through air line 42. Air line 42 fluidly connects cyclone separator 28 with boiler 36 upstream of air preheater 52. The smaller sorbent particles 15 entrained in the bypass air BA are then also injected by a steam powered injector 38 directly into flue gas FG comprising mercury produced in the coal-fired boiler 36. Since smaller sorbent particles 15 and excess transport air TA bypass steam powered jet mill 20, steam powered jet mill 20 has more capacity for milling the larger separated carbonaceous sorbent particulates 50 to produce milled carbonaceous sorbent 34 particulates. Also, because the cyclone separator 28 and steam injectors 38 and 54 are operated to process smaller sorbent particles 15 and carbonaceous sorbent 34 at the same flow rate as the carbonaceous sorbent 14 is fed from the storage silo 18, no additional carbonaceous sorbent storage is required. With no such carbonaceous sorbent storage requirement, both capital and operation expenses are reduced. As an added safety feature of the subject steam powered mill system 16, the cyclone separator 28 relieves backpressure to transport line 30 in the case of an obstruction or pressure increase in air line 42 or steam line 44.

All steam powered components of the subject steam powered mill system 16 are powered through a steam source 56. Steam source 56 is powered by and/or is supplied steam from fluidly connected coal-fired power plant 10. Steam source 56 and coal-fired power plant 10 are fluidly connected by transport line 62. Steam from steam source 56 is supplied to steam powered eductor 32 through fluidly connected steam line 58. Likewise, steam from steam source 56 is supplied to steam powered jet mill 20 through fluidly connected steam line 60.

A method for processing carbonaceous sorbent 14 using the subject steam powered mill system 16 of the subject carbonaceous sorbent processing system 12 is accomplished by providing a sorbent silo 18 for supply of a carbonaceous sorbent 14 to a cyclone separator 28 for separation the carbonaceous sorbent 14 into larger separated carbonaceous sorbent particulates 50, about 9 to about 30 microns in size, and smaller sorbent particles 15, about 3 to about 18 microns in size. A steam powered jet mill 20 is then used for milling the larger separated carbonaceous sorbent particulates 50 to produce milled sorbent 34, about 3 to about 18 microns in size. The smaller sorbent particles 15 are entrained in bypass air BA and transported thereby to a steam powered injector 38 for injection into boiler 36 flue gas FG comprising mercury for mercury adsorption by the smaller sorbent particles 15. Additionally, milled sorbent 34 is transported to steam powered injector 54 for injection into boiler 36 flue gas FG comprising mercury for mercury adsorption by the milled sorbent 34. According to the subject method, the smaller sorbent particles 15 are transported in air line 42 at a pressure of about 5 to about 15 psig, or preferably at a pressure of about 1.5 to about 6 psig, supplied by eductor 22 and optional blower 46. As mentioned previously, if eductor 22 is used in combination with blower 46, a lower pressure eductor 22 may be used lowering both operation costs and capital costs associated therewith. The milled sorbent particulates 34 are transported in steam line 44 at a pressure of about 5 to about 15 psig, or preferably at a pressure of about 1.5 to about 6 psig, supplied by a steam powered eductor 32. As such, the milled carbonaceous sorbent 34 particulates transported through steam line 44, are injected by steam injector 54 directly into flue gas (FG) comprising mercury produced in coal-fired boiler 36 of coal-fired power plant 10 for mercury capture.

According to this method, the cyclone separator 28 releases pressure into transport line 30 upon an obstruction in the transport of smaller sorbent particles 15 or milled sorbent 34. Another feature of the subject method is that an injector 54 for injection of milled sorbent 34 is operated at an operation rate the same as an operation rate of the cyclone separator 28 thus avoiding need for storage of the larger separated carbonaceous sorbent particulates 50 or milled sorbent 34 at the site of milling.

While preferred embodiments have been shown and described, various modifications and substitutions may be made thereto without departing from the spirit and scope of the invention. Accordingly, it is to be understood that the present invention has been described by way of illustration and not limitation.

We claim:

1. A system for processing carbonaceous sorbent comprising:
    a sorbent silo;
    a cyclone separator supplied sorbent from the sorbent silo for separating the sorbent supplied into larger sorbent particulates and smaller sorbent particles;
    a steam powered jet mill for milling larger sorbent particulates to produce milled sorbent;
    an air line for transport of smaller sorbent particles for injection of the smaller sorbent particles into a boiler flue gas containing mercury for mercury adsorption by the smaller sorbent particles; and
    a steam line for transport of milled sorbent for injection of milled sorbent into a boiler flue gas containing mercury for mercury adsorption by the milled sorbent.

2. The system according to claim 1, wherein the smaller sorbent particles are transported in an air line.

3. The system according to claim 1, wherein the milled sorbent is transported in a steam line.

4. The system according to claim 1, wherein the smaller sorbent particles are about 3 to about 18 microns in size.

5. The system according to claim 1, wherein the larger sorbent particulates are about 9 to about 30 microns in size.

6. The system according to claim 1, wherein the milled sorbent particulates are about 3 to about 18 microns in size.

7. The system according to claim 1, wherein the cyclone separator releases pressure into a transport line upon an obstruction in the transport of smaller sorbent particles or milled sorbent.

8. The system according to claim 1, wherein an injector for injection of milled sorbent is operated at an operation rate the same as an operation rate of the cyclone separator.

9. A method for processing carbonaceous sorbent comprising:
    providing a sorbent silo for supply of a carbonaceous sorbent to a cyclone separator for separating the carbonaceous sorbent into larger sorbent particulates and smaller sorbent particles;
    using a steam powered jet mill for milling larger sorbent particulates to produce milled sorbent;
    transporting smaller sorbent particles to injection into a boiler flue gas containing mercury for mercury adsorption by the smaller sorbent particles; and
    transporting milled sorbent to injection into a boiler flue gas containing mercury for mercury adsorption by the milled sorbent.

10. The method according to claim 9, wherein the smaller sorbent particles are transported in an air line.

11. The method according to claim 9, wherein the milled sorbent is transported in a steam line.

12. The method according to claim 9, wherein the smaller sorbent particles are about 3 to about 18 microns in size.

13. The method according to claim 9, wherein the larger sorbent particulates are about 9 to about 30 microns in size.

14. The method according to claim 9, wherein the milled sorbent particulates are about 3 to about 18 microns in size.

15. The method according to claim 9, wherein the cyclone separator releases pressure into a transport line upon obstruction in transporting smaller sorbent particles or milled sorbent.

* * * * *